United States Patent Office 2,769,721
Patented Nov. 6, 1956

2,769,721

PIGMENT COMPOSITIONS

Egon Frankl, Rochester, N. Y., assignor to Rochester Button Company, Rochester, N. Y., a corporation of New York No Drawing. Application September 29, 1952, Serial No. 312,178

15 Claims. (Cl. 106—308)

This invention relates to new dry pigment compositions which are readily dispersible in liquid media and to a method of making them.

It has been found that by treating aqueous dispersions of pigments with Werner type complex compounds in which trivalent chromium is coordinated with a carboxylic acid, particularly acyclic and alicyclic carboxylic acids, such as stearic, methacrylic and abietic acid, the complex chromium compounds become attached to the surfaces of the pigment particles, so that the pigments may be dried without any substantial loss of dispersibility in liquid media.

This treatment is particularly effective in maintaining the dispersibility of pearlescent pigments such as acid lead phosphate and acid lead arsenate, in which the pigment particles are thin, flat crystalline lamellae which on drying stick together and are very difficult to redisperse. Since the pearlescent, lustrous appearance of pigments of this type is dependent on the uniform dispersion and orientation of the lamella pigment particles, these pigments are usually sold and stored in the form of pastes which is inconvenient and expensive.

When pigments dispersed in an aqueous medium are treated with Werner type complex compounds of trivalent chromium coordinated with alpha, beta unsaturated acyclic carboxylic acids containing from two to six carbon atoms in the aliphatic chain, such as acrylic acid and the substituted acrylic acids, and the pigment is thereafter dried, the dry pigment is readily dispersible in water and polar liquids such as methyl alcohol.

When an aqueous pigment dispersion is treated with a Werner type complex compound of trivalent chromium coordinated with a long chain fatty acid containing from 10 to 20 carbonations, such as stearic acid, and the pigment is thereafter dried, the dry pigment is readily dispersible in non-polar liquids, such as benzene. However, the addition of a small quantity of a wetting agent such as Nacconol renders the dry pigment readily dispersible in water and polar liquids. Pigments treated with either the acrylic type complexes and the stearate type complexes are readily dispersible in liquids intermediate the polar and non-polar liquids such as butyl alcohol and are also readily dispersible in plastic compositions such as polyester resin plastics.

*Example 1*

One and one-half pounds of a 30% aqueous solution of a stearato chromic chloride Werner type complex, sold under the name "Quilon," is diluted with 6 liters of water and hydrolysed by heating to about 93–94° C. This solution is mixed with an aqueous paste containing thirty pounds of acid lead arsenate pigment in 140 liters of water. The pigment is washed to eliminate excess chromium compound, separated by filtering or centrifuging and dried. The dried pigment breaks up readily and gives uniform dispersions in organic liquids and in water containing a wetting agent.

*Example 2*

One and one-half pounds of a 20% solution of a methacrylate chromic chloride Werner type complex, sold under the name "Volan," is diluted with about 6 liters of water and hydrolysed by heating to boiling. The solution is mixed with a paste containing thirty pounds of acid lead arsenate pigment, and the pigment is washed, separated and dried as in Example 1. The dry pigment is readily dispersible in water and polar organic liquids.

I claim:

1. A method of making readily dispersible dry lamellar pearlescent pigment compositions which comprises adding a Werner type complex compound of trivalent chromium with an aliphatic carboxylic acid of the group consisting of alpha, beta unsaturated aliphatic carboxylic acids containing from 2 to 6 carbon atoms in the aliphatic chain and long chain fatty acids containing from 10 to 20 carbon atoms to an aqueous dispersion of a lamellar pearlescent pigment selected from the group consisting of acid lead phosphate and acid lead arsenate and thereafter separating the pigment from the dispersion and drying the pigment.

2. A method of making readily dispersible dry lamellar pearlescent pigment compositions which comprises adding a Werner type complex compound of trivalent chromium with an alpha, beta unsaturated aliphatic carboxylic acid containing from 2 to 6 carbon atoms in the aliphatic chain to an aqueous dispersion of a lamellar pearlescent pigment selected from the group consisting of acid lead phosphate and acid lead arsenate and thereafter separating the pigment from the dispersion and drying the pigment.

3. A method of making readily dispersible dry lamellar pearlescent pigment compositions which comprises adding a Werner type complex compound of trivalent chromium with a long chain fatty acid containing from 10 to 20 carbon atoms to an aqueous dispersion of a lamellar pearlescent pigment selected from the group consisting of acid lead phosphate and acid lead arsenate and thereafter separating the pigment from the dispersion and drying the pigment.

4. A method of making readily dispersible dry lamellar pearlescent pigment compositions which comprises adding a Werner type complex compound of trivalent chromium with methacrylic acid to an aqueous dispersion of a lamellar pearlescent pigment selected from the group consisting of acid lead phosphate and acid lead arsenate and thereafter separating the pigment from the dispersion and drying the pigment.

5. A method of making readily dispersible dry lamellar pearlescent pigment compositions which comprises adding a Werner type complex compound of trivalent chromium with stearic acid to an aqueous dispersion of a lamellar pearlescent pigment selected from the group consisting of acid lead phosphate and acid lead arsenate and thereafter separating the pigment from the dispersion and drying the pigment.

6. A dry readily dispersible pigment composition comprising lamellar pearlescent pigment particles selected from the group consisting of acid lead phosphate and acid lead arsenate having a surface coating of a Werner type complex compound of trivalent chromium with an aliphatic carboxylic acid of the group consisting of alpha, beta unsaturated aliphatic carboxylic acids containing from 2 to 6 carbon atoms in the aliphatic chain and long chain fatty acids containing from 10 to 20 carbon atoms.

7. A dry readily dispersible pigment composition comprising lamellar pearlescent pigment particles selected from the group consisting of acid lead phosphate and acid lead arsenate having a surface coating of a Werner type complex compound of trivalent chromium with an alpha, beta unsaturated aliphatic carboxylic acid containing from 2 to 6 carbon atoms in the aliphatic chain.

8. A dry readily dispersible pigment composition comprising lamellar pearlescent pigment particles selected from the group consisting of acid lead phosphate and acid lead arsenate having a surface coating of a Werner type complex compound of trivalent chromium with a long chain fatty acid containing from 10 to 20 carbon atoms.

9. A dry readily dispersible pigment composition comprising lamellar pearlescent pigment particles selected from the group consisting of acid lead phosphate and acid lead arsenate having a surface coating of a Werner type complex compound of trivalent chromium with methacrylic acid.

10. A dry readily dispersible pigment composition comprising lamellar pearlescent pigment particles selected from the group consisting of acid lead phosphate and acid lead arsenate having a surface coating of a Werner type complex compound of trivalent chromium with stearic acid.

11. A dry readily dispersible pigment composition comprising lamellar crystalline particles of acid lead arsenate having a surface coating of a Werner type complex compound of trivalent chromium with an aliphatic carboxylic acid of the group consisting of alpha, beta unsaturated aliphatic carboxylic acids containing from 2 to 6 carbon atoms in the aliphatic chain and long chain fatty acids containing from 10 to 20 carbon atoms.

12. A dry readily dispersible pigment composition comprising lamellar crystalline particles of acid lead arsenate having a surface coating of a Werner type complex compound of trivalent chromium with an alpha, beta unsaturated aliphatic carboxylic acid containing from 2 to 6 carbon atoms in the aliphatic chain.

13. A dry readily dispersible pigment composition comprising lamellar crystalline particles of acid lead arsenate having a surface coating of a Werner type complex compound of trivalent chromium with a long chain fatty acid containing from 10 to 20 carbon atoms.

14. A dry readily dispersible pigment composition comprising lamellar crystalline particles of acid lead arsenate having a surface coating of a Werner type complex compound of trivalent chromium with methacrylic acid.

15. A dry readily dispersible pigment composition comprising lamellar crystalline particles of acid lead arsenate having a surface coating of a Werner type complex compound of trivalent chromium with stearic acid.

References Cited in the file of this patent

UNITED STATES PATENTS

| | | |
|---|---|---|
| 2,266,793 | Oppermann | Dec. 23, 1941 |
| 2,273,040 | Iler | Feb. 17, 1942 |
| 2,483,469 | Kebrich | Oct. 4, 1949 |
| 2,552,795 | King et al. | May 15, 1951 |